United States Patent [19]

Barker et al.

[11] Patent Number: 5,557,703
[45] Date of Patent: Sep. 17, 1996

[54] OPTICAL FIBRES FOR BLOWN INSTALLATION

[75] Inventors: Philip A. Barker; David J. Stockton; Christopher Fisk; Peter D. Jenkins, all of Suffolk, England

[73] Assignee: British Telecommunications public limited company, London, England

[21] Appl. No.: 464,092

[22] Filed: Jun. 5, 1995

Related U.S. Application Data

[62] Division of Ser. No. 170,287, filed as PCT/GB92/01190, Jul. 1, 1992 published as WO93/01512, Jan. 21, 1993.

[30] Foreign Application Priority Data

Jul. 1, 1991 [GB] United Kingdom ............... 9114196
Jan. 21, 1992 [GB] United Kingdom ............... 9201283

[51] Int. Cl.⁶ ........................... G02B 6/44; G02B 6/52
[52] U.S. Cl. ........................ 385/128; 385/100; 385/141
[58] Field of Search .......................... 385/123, 124, 385/126–128, 141, 144, 145, 147, 100

[56] References Cited

U.S. PATENT DOCUMENTS 5,042,907  8/1991  Bell et al. ........................... 385/123
5,109,456  4/1992  Sano et al. .......................... 385/100

FOREIGN PATENT DOCUMENTS

| | | |
|---|---|---|
| 0157610 | 10/1985 | European Pat. Off. . |
| 0345968 | 12/1989 | European Pat. Off. . |
| 0382144 | 8/1990 | European Pat. Off. . |
| 0442308A2 | 8/1991 | European Pat. Off. . |
| 2924495 | 1/1981 | Germany . |
| 2242540 | 10/1991 | United Kingdom . |
| WO84/03085 | 8/1984 | WIPO . |

OTHER PUBLICATIONS

Suzuki et al, "Fine and tough Optical Cords with Polyetherimide Coated Fibers", 5th International Conference on Plastics in Telecommunications, 1989, London, pp. 12/1–12/7. [No Month].

*Primary Examiner*—John D. Lee
*Attorney, Agent, or Firm*—Nixon & Vanderhye P.C.

[57] ABSTRACT

An optical fibre package suitable for installation using a fibre blowing process includes at least one optical fibre, an inner coating about said fibre, and an outer resin coating about said inner coating, said resin coating including a significant plurality of particulate inclusions at least 10 μm across, wherein the concentration of the particulate inclusions is significantly greater at the outer surface of the resin coating than at the inner limit of the resin coating. The inclusions may be hollow glass microspheres or mica flakes. The relative absence of significant particulate inclusions at the inner limit of the resin coating improves the mechanical particulate of the fibre package relative to similar known packages. The presence of significant inclusions at the outer surface of the resin coating tends, during a blowing process, to increase viscous drag effects and to reduce friction between the package and the duct into which the package is blown, thereby enhancing blowability.

9 Claims, 12 Drawing Sheets

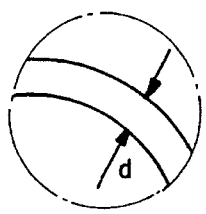
Fig. 4A
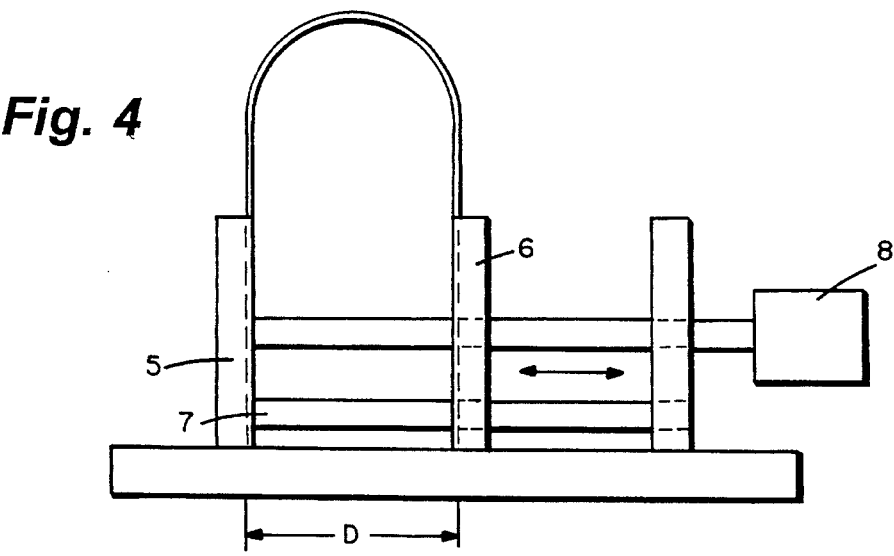
Fig. 4
Fig. 10
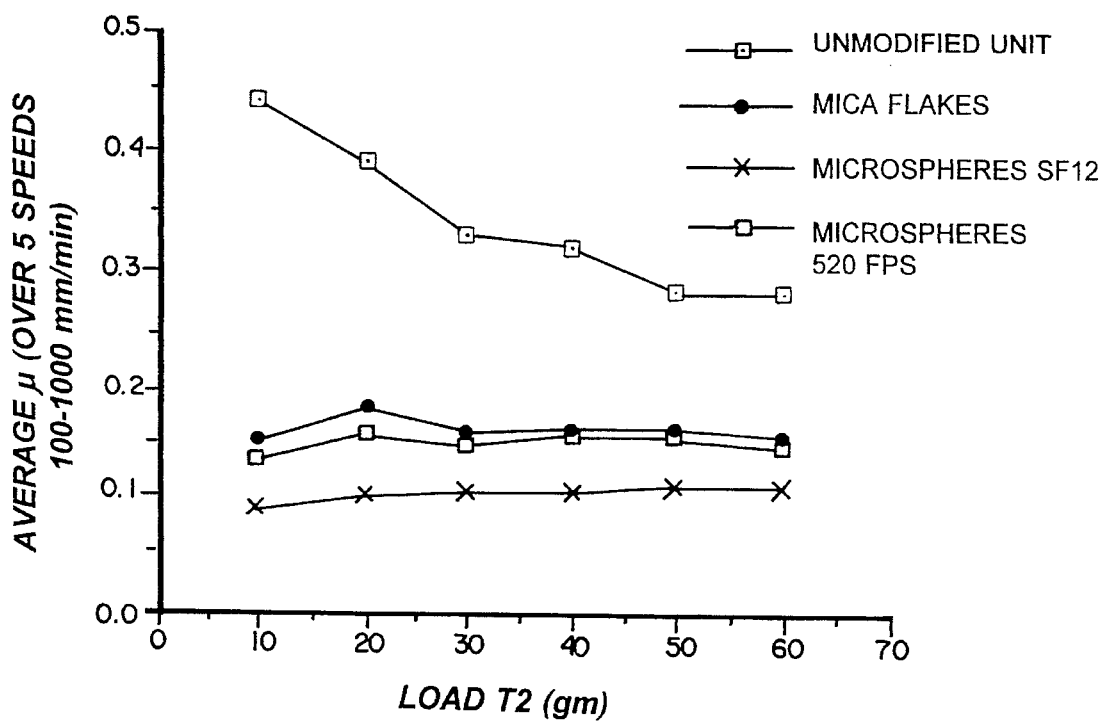

Fig. 5.
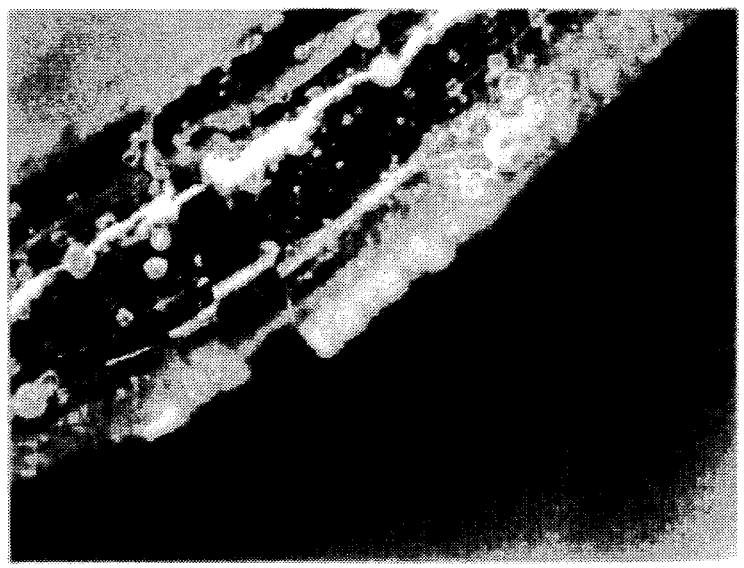
Fig. 5. A
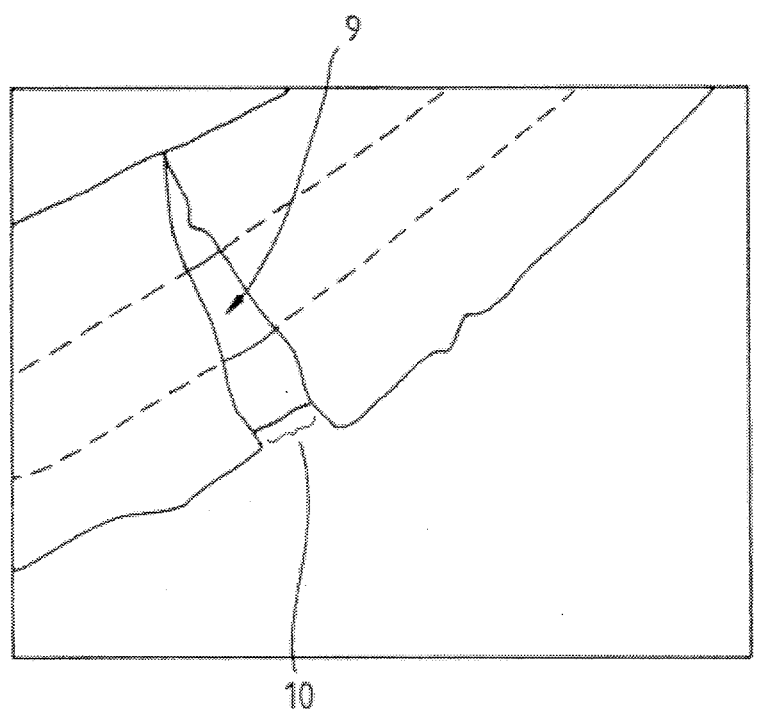

Fig. 6.
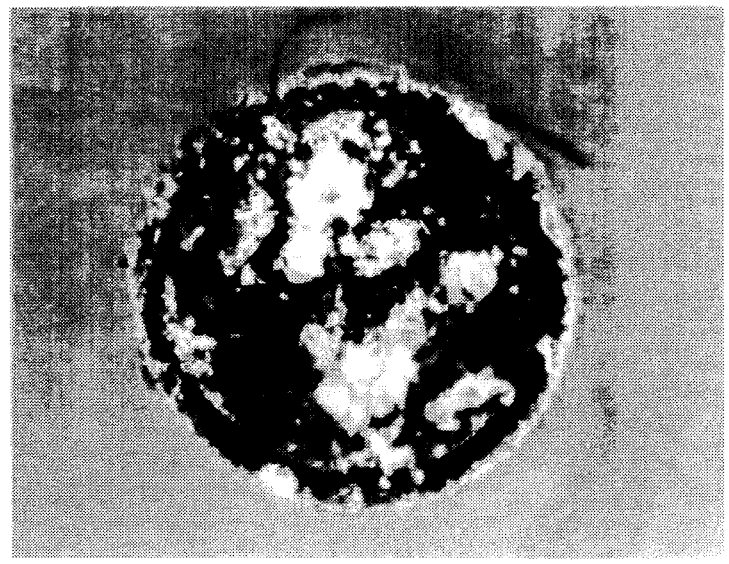
Fig. 6.A
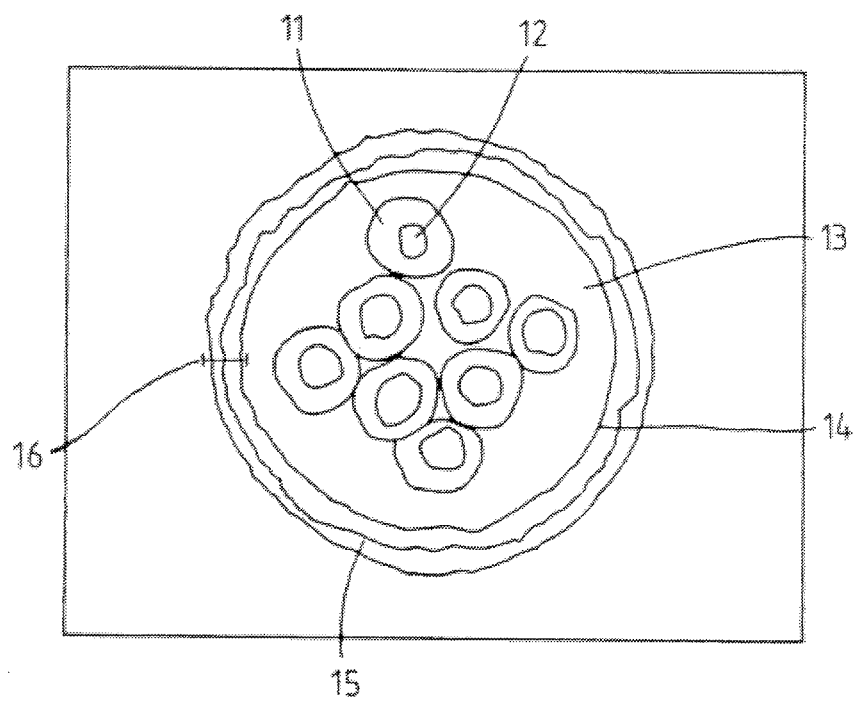

Fig. 8

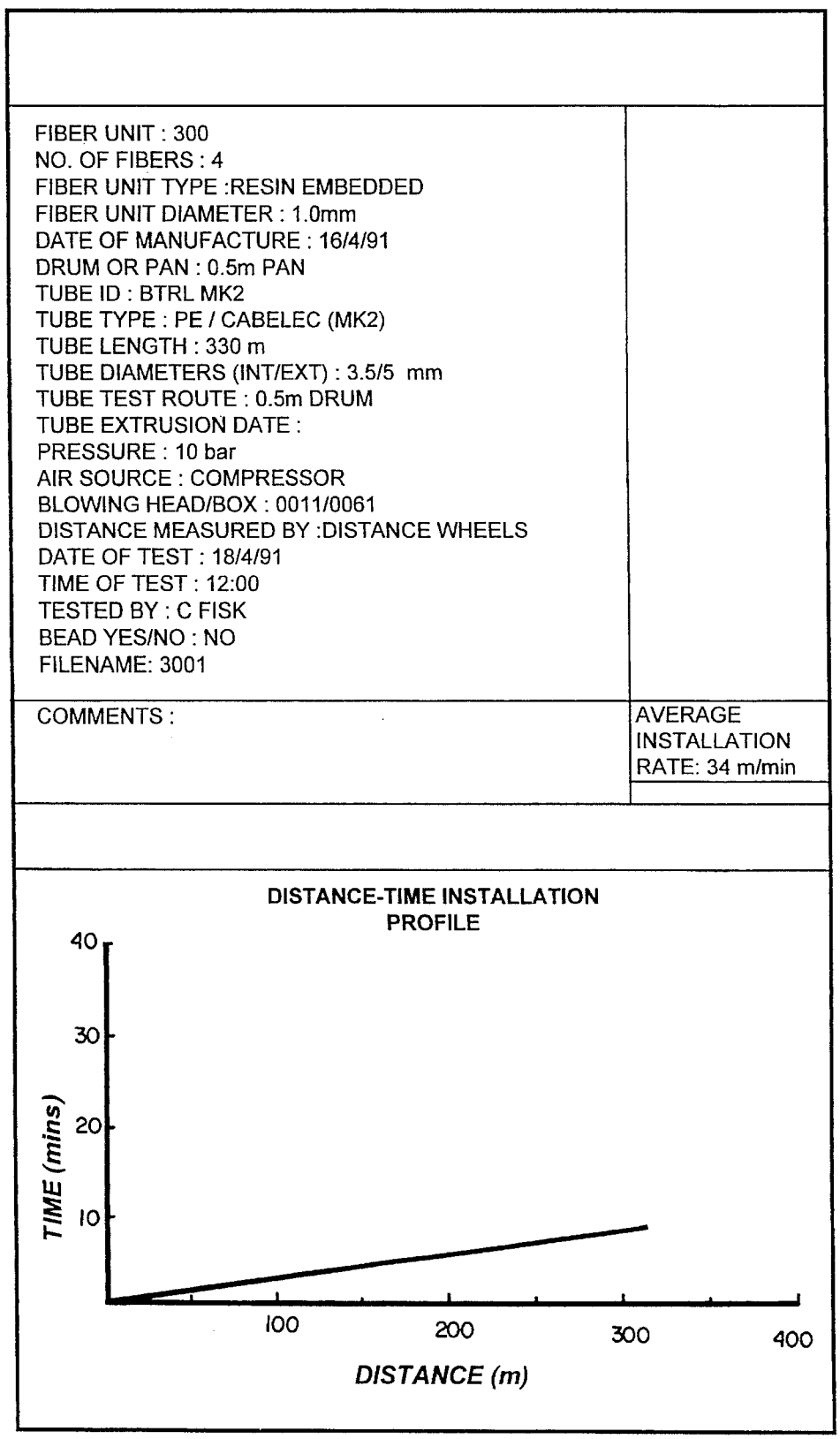

FIBER UNIT : 300
NO. OF FIBERS : 4
FIBER UNIT TYPE :RESIN EMBEDDED
FIBER UNIT DIAMETER : 1.0mm
DATE OF MANUFACTURE : 16/4/91
DRUM OR PAN : 0.5m PAN
TUBE ID : BTRL MK2
TUBE TYPE : PE / CABELEC (MK2)
TUBE LENGTH : 330 m
TUBE DIAMETERS (INT/EXT) : 3.5/5 mm
TUBE TEST ROUTE : 0.5m DRUM
TUBE EXTRUSION DATE :
PRESSURE : 10 bar
AIR SOURCE : COMPRESSOR
BLOWING HEAD/BOX : 0011/0061
DISTANCE MEASURED BY :DISTANCE WHEELS
DATE OF TEST : 18/4/91
TIME OF TEST : 12:00
TESTED BY : C FISK
BEAD YES/NO : NO
FILENAME: 3001

COMMENTS :

AVERAGE INSTALLATION RATE: 34 m/min

Fig. 11  EPFU FRICTION ANALYSIS
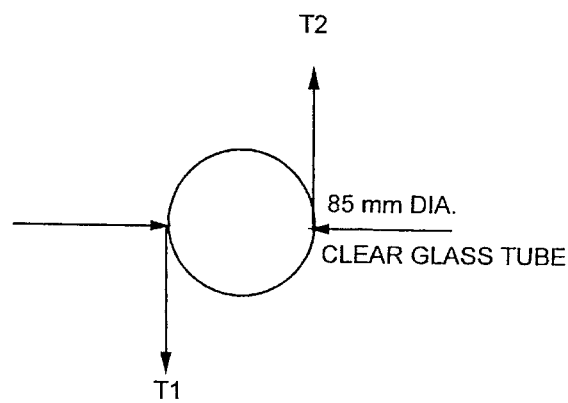
5 TRAVERSING SPEEDS : 100, 200, 300, 500, 1000 mm/min
$\mu = (\ln T_1 - \ln T_2) / 2\pi N$
WHERE N = 1 (NUMBER OF TURNS AROUND CLASS TUBE)
Fig. 12
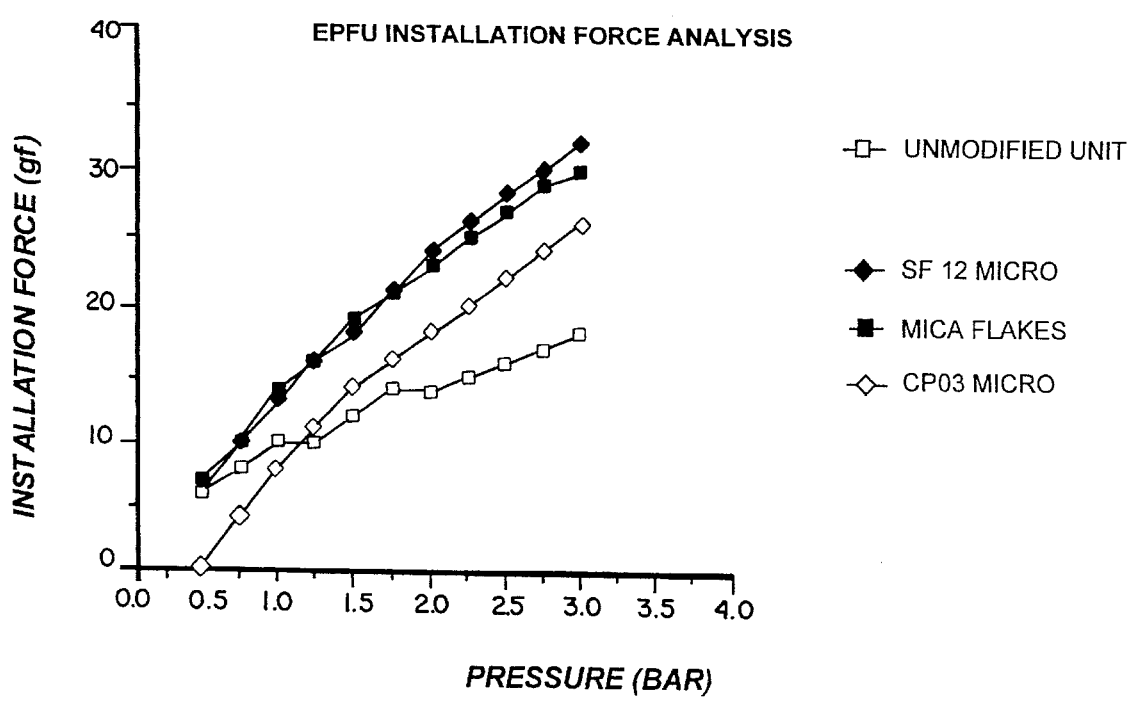

Fig. 14

PROCESSING DATA SHEET

UNIT NO. 348

|  | TOP CUP | BOTTOM CUP |
|---|---|---|
| RESIN | 3287-9-39 | 950-705 |
| CHAMBER VAC (bar) | 0.36 |  |
| PRESSURE (mbar) | 631 | 438 |
| TEMP (°C) | 52.8 | 29.3 |
| SIZE (mm) | 0.788 | 0.924 |
| CONCEN-TRICITY(mm) | 0.007 | 0.05 |
| FLOW RATE (1/min) | 15 | 15 |
| LAMP SETTIN | LOW |  |
| BULB | D | D |
| DIES | RES 31224 | RES 30960/C |
| LINE SPEED (m/min) | 60 |  |

| NO | COLOR | FIBER NUMBER | BACK TENSION | NO | LINE CODE | FIBER NUMBER | BACK TENSION |
|---|---|---|---|---|---|---|---|
| 1 | GREEN | 1601 | 100g | 5 |  |  |  |
| 2 | ORANGE | 1600 | 100g | 6 |  |  |  |
| 3 | BLUE | 1599 | 100g | 7 |  |  |  |
| 4 | RED | 1602 | 100g | 8 |  |  |  |

| | | |
|---|---|---|
| CONVEYING AIR (BAR) | 0.15 | FLUIDISING AIR (bar) | 0.2 |
| DOSING AIR (m³/Hr) | 4 | ELECTROSTATIC (kV) | 70 |
| EXTERNAL AIR (m³/Hr) | 0.5 | ROOM TEMP (°C) | 19 |
| SURFACE MODIFICATION | QCEL 520 FPS | | |

COMMENTS:

OPTICAL FIBRES FOR BLOWN INSTALLATION

This is a division of application Ser. No. 08/170,287, filed as PCT/GB92/01190, Jul. 1, 1992 published as WO93/01512, Jan. 21, 1993.

BACKGROUND OF THE INVENTION

1. Field of the Invention

This invention relates to coated optical fibres and methods for their production. In particular the invention relates to coated optical fibres which are especially suitable for use in blown fibre systems.

2. Related Art

Optical fibres are now widely used in place of electrical conductors in the communications field. Typically, glass optical fibres have an external diameter in the range 100–150 μm, usually 125 μm. Polymer fibres are normally somewhat larger in diameter. Unlike conventional electrical conductors, optical fibres are generally fragile and easily damaged to the detriment of their performance and lifetime. Consequently, it is important to protect the fibres from damage.

The first step in the protection of optical fibres occurs, at least in the case of glass fibres, immediately after the fibres are drawn and involves the application of one or two layers of synthetic resin coating. This protection, whether one or two layers, is somewhat loosely referred to as the "primary coating", and fibres so coated are sometimes known as "primary coated fibres". Alternatively, and more accurately, the coatings are sometimes referred to as the primary and secondary coatings, and this convention is adopted in this specification. The first coating, which is typically a low-modulus silicone or acrylate polymer is applied to the fibre surface at a point no more than about a meter from the point where the fibre is drawn down. Commonly, the primary coating is UV curable. The primary coating is also known as the buffer layer, since it serves to buffer the fibre from lateral pressure. The reason for applying the primary coating practically as soon as the fibre is formed is that the strength of glass and other small fibres depends critically on the extent to which their surface is free from cracks and microcracks. In order to avoid the formation of microcracks it is important to protect the fibre surface from dust and other causes of abrasion, and to this end the zone between the point of fibre drawing and the point of application of the primary coating is kept short and dust-free. The mechanical properties of primary coating materials are critical to the performance of optical fibres. In particular, the coating should not induce microbends in the fibre and the mechanical properties should be compatible with those of the fibre.

A particularly important consideration is the material's coefficient of thermal expansion (TCE). The different in TCEs between the material of the fibre (normally a silica-based glass, which means a low TCE) and that of the primary coating (normally with a TCE an order of magnitude or more greater) means that at low temperatures fibres may be subject to considerable compressive stress, significantly increasing optical loss. This effect is generally made worse by increasing the primary coating thickness, and of course with reduced temperatures.

The secondary coating is typically a hard and robust material, such as nylon, to protect the primary coating, and hence the fibre, from damage. [Increasingly, acrylates, e.g. urethane acrylate, are being used in place of nylon.] Again, the physical properties of the material are very important in terms of their effect on the optical performance of the fibre, particularly its temperature sensitivity. Particularly now that optical fibres are being more widely deployed, it is important that optical fibres can be packaged to withstand extremes of temperature. In practice, it is insensitivity to low temperatures, e.g. sub-zero centigrade, which is the most difficult to achieve. For network use in continental climates, it is desirable that optical fibres should show no significant excess loss at temperatures as low as −20°, −40° or even −60° C. Some relevant aspects of the temperature sensitivity of optical fibres are dealt with in the following papers:

T. A. Lenahan, A. T. & T. Tech. J., V.64, No. 7, 1985, pp 1565–1584, T. Yabuta, N. Yoshizawa and K. Ishihara, Applied Optics, V.22, No. 15, 1983, pp. 2356–2362; and Y. Katasuyama, Y. Mitsunaga, Y. Ishida and K. Ishihara, Applied Optics, V. 19, No. 24, 1980, pp 4200–4205.

Conventionally, the primary or secondary coated fibres, which typically have a diameter of about 250 μm, are made up into cables which provides the required level of mechanical protection for the optical fibres. It is important to protect the optical fibres from strain, consequently it is usual to decouple the optical fibres from the bulk of the cable structure. Typically, this decoupling is effected by locating the optical fibre(s) in a tube or slot in which the fibre is free to move. In addition to decoupling the fibres, it is necessary to ensure that the rest of the cable structure can withstand the loads which will be applied during installation or use of the cable, without imposing excess strain on its optical fibres. Since the level of strain which optical fibres can endure without damage is very low, typically less than 0.2 percent, cable structures need to be very strong. Typically, optical fibre cables are installed in much the same way as copper wire cables, that is they are pulled into place through ducts and conduits using a rope attached to a cable end. Cables experience very high tensile loadings during such installation, and consequently optical fibre cables need very considerable reinforcement to prevent their optical fibres being damaged. These requirements increase the size, weight and cost of optical fibre cables.

As alternative approach to optical fibre installation is described in our European patent EP-B-0108590. In this method the fibres are installed along a previously installed duct using fluid drag of a gaseous medium which passes through the duct in the desired direction of advance. This method, which is known as Blown Fibre or Fibre Blowing uses distributed viscous drag forces to install a fibre unit which is supported on a cushion of air.

Since the duct is installed first, conveniently using traditional cable installation techniques, without any optical fibres and since there is no significant stress imposed on the fibre unit during blowing, it is possible to use very lightweight fibre structures. Indeed, in terms of space-saving and routing flexibility it is desirable if the fibre unit is both small and flexible. Typically, a fibre unit consists of a plurality of conventionally coated optical fibres held together in a lightweight polymer sheath which has a foamed coating. Such multiple-fibre units may also include a ripcord to facilitate the splitting out of the fibres from the unit for termination of the fibres. Examples of multiple-fibre units are described in our European patent EP-B-0157610 and EP-A-0296836. Fibre units can also usefully consist of just a single fibre provided with a suitably bulky and lightweight sheath, as discussed in EP-B- 0157610 and EP-A-029836. An example of a single-fibre unit is described in EP-A-0338854 and EP-A-0338855.

It has been found to be desirable, e.g. for good blowing performance, for the coatings in a fibre unit to surround the fibres tightly. As a result of this, the mechanical properties of the fibre unit coatings are as significant to the temperature sensitivity of the optical fibres as the mechanical properties of the primary and secondary coatings. It is no surprise, therefore, to learn that in EP-A-0296836 the fibre unit coatings comprises: an inner strength of a material which is soft and has a low modulus of elasticity, e.g. an acrylate or thermoplastic rubber; an optical intermediate sheath which is hard (greater than 75 D Shore hardness) and has a high modulus of elasticity (greater than 900 N/nm$^2$), to confer mechanical protection on the soft sheath, and an outer sheath of foamed material. This arrangement is akin to the primary and secondary coatings whose application to individual fibres was described above, with the addition of a foamed layer to reduce the fibre unit density and hence improve blowability. However, while there is some similarity between the requirements made of primary and secondary coatings and those made of what might be regarded as the tertiary and quaternary coatings, particularly when one is only coating a single fibre, there are extra constraints which only apply when one is provided a coating system which has to hold several fibres together. Thus, in a multiple-fibre unit one would expect to use materials having larger elastic moduli and in considerably greater thicknesses. Moreover, when a multiple-fibre unit is bent, the individual fibres will generally each experience different bending forces and will tend to move relative to each other. In addition, the larger diameter of multiple-fibre units means that for a given bend radius the outer surface of the outer coating is exposed to greater tensile and compressive stress than in a single-fibre unit. It is clear therefore that one cannot necessarily expect a coating system which works on a single-fibre unit to work for a multi-fibre unit. A further consideration is that while one might expect stronger coatings to solve the problem of transition from single—to multiple-fibre units, it has to be borne in mind that the optical properties of the optical fibres in a fibre unit are very dependent on the physical properties of the coatings used in it. In particular, and an mentioned previously, the physical properties of optical fibre coatings markedly affect the temperature sensitivity of optical fibres coated therewith. Moreover, the stiffness of a fibre unit markedly affects its blowing performance. If a fibre unit is too stiff, it will not blow—at least in a real-life environment.

Thus, it is by no means clear that a coating system which works for a single-fibre unit will also work for a multiple fibre unit.

In EP-A-0345968 there is described a range of single-fibre units having an external coating which comprises a radiation-cured polymer containing particulate matter. The particulate matter is variously, PTFE particles, hollow glass microspheres, or hollow polymeric microspheres. The particulate matter, which preferably has an average particle size of less than 60 microns, is mixed in with the un-cured liquid polymer. The fibre to be coated, which may already have a tertiary buffer layer, is drawn through a bath containing the polymer/particulate mixture to give an outer coating having a thickness in the range 10 to 70 microns. The coating is then cured using UV radiation.

We have found that the coating systems as described in EP-A-0345968 are not suitable for use in sheathing multiple-fibre units. In particular, we have found that such coatings on multiple-fibre units tend to fail when the unit is bent.

We have found that, particularly with multiple-fibre units such as 4-fibre and 8-fibre units, the coating system described in EP-A-0345968 for single-fibre units wherein particulate matter is mixed in with the outer coating polymer, produces fibre units which are very prone to "fibre breakout". As a fibre unit is progressively bent, and thus experiences a progressively smaller bend radius, a certain bend radius is reached at which irreversible damage to the sheathing occurs allowing the secondary coated fibres to be exposed. This phenomenon is known as fibre-breakout. If the bend radius at which fibre-breakout occurs (the minimum bend radius) at which fibre unit is likely to experience its minimum bend radius during normal handling of the fibre unit, the unit is in practice not useable.

SUMMARY OF THE INVENTION

It is an object of the present invention to provide an improved coating system for multiple-fibre units. The invention also seeks to provide multi-fibre units having good long-distance blowing performance and an improved resistance to fibre break-out.

In a fibre aspect the present invention provides an optical fibre package for blown installation, the package comprising at least one optical fibre and having an outer coating of cured flexible resin, the surface of said resin coating having been modified prior to the cure of said resin, the effects of the surface modification still being detectable. We have found that by modifying the surface of the resin after its application we can obtain the benefits of increased viscous drag and/or reduced friction without significantly impairing the mechanical properties of the resin. As a consequence it is possible to produce fibre units of good blowability with good mechanical properties—in particular with good fibre break-out performance. These benefits are of particular importance with multiple-fibre units but are also of value in single-fibre units.

Preferably the surface modification comprises the addition of desired particulate matter to the surface of the uncured resin.

The addition of particular matter enables a wide range of surface effects to be achieved and in particular enables the provision of a surface having a much lower coefficient of friction (with respect to a duct wall) than that offered by the resin alone. The material and shape of the particulate matter can be chosen largely independently and combinations chosen with a view to achieving a good balance of such properties as viscous drag, friction with respect to duct material, break-out resistance, durability, abrasiveness/wear resistance.

Preferably the particulate matter is in the form of balls, for example microspheres. More preferably the balls are hollow.

The round surfaces of balls provide significant surface area to enable good bonding with the uncured resin surface. The round surface also means that the finished unit is not too abrasive, reducing the wear on the working surfaces of the blowing equipment and reducing damage to the walls of ducts during blowing. Additionally, although when very small balls are used some balls may enter and become completely submerged in the outer region of the uncured resin surface, the resin surface itself tends to become covered with balls which are stuck like flies on flypaper—that is with the bulk of each ball projecting above the resin surface. The effect is advantageous in terms of increasing the viscous drag which is experienced by the unit during blown installation. Additionally, where, as is preferable, the material(s) of the balls has/have been chosen to be such as to have a low friction coefficient with respect to the materials which will be used for the duct surface (which will typically be carbon-loaded high density polyethylene but may for example be a metal such as stainless steel), glass for example, the fact that the surface of the fibre unit is in effect now provided by such a material rather than the resin will mean that the unit has a much lower co-efficient of friction. Each of these effects alone will contribute to increasing the blowability (that is the length of the unit which can be installed in a given duct under given blowing conditions) of the unit, but the combination of the two effects may synergistically increase blowability.

The use of hollow rather than solid balls enables relatively dense materials, such as glass, to be used without significantly increasing the mean density of the fibre unit. Indeed the use of hollow balls may enable the mean density of the fibre unit to be reduced compared to that for the fibre unit without particulate additions, even where the balls consist of a dense material such as glass. Where materials other than glass are chosen for the balls they may also be provided in hollow form, with further potential reductions in density.

As an alternative to the use of balls, the particular matter may be in the form of lumps or flakes.

Preferably a significant plurality of the particulate inclusions are at least 10 microns across.

While the use of particles less than 10 microns across does not affect break-out performance, such small particles tend to offer no improvement in viscous drag effects and there may only be minor reductions in friction. Larger particles are therefore preferred.

BRIEF DESCRIPTION OF THE DRAWINGS

Preferred embodiments of the present invention will now be described by way of example only with reference to the accompanying drawings, in which:

FIGS. 4 and 4A show schematically the apparatus and test used to ascertain fibre break-out radii;

FIGS. 5 and 5A show a prior art fibre unit which has been subject to breakout.

FIGS. 6 and 6A show a photomicrograph and analysis of an end section of an 8-fibre unit according to the invention;

FIGS. 7 and 8 are plots representing fibre package blowability;

FIG. 10 is a plot of a friction analysis of several fibre unit types;

FIG. 11 is a schematic illustrating the method used to assess the frictional behaviour of the units analysed in FIG. 10;

FIG. 12 is a plot of installation force for several fibre unit types;

FIG. 14 shows processing details for the production of a typical fibre unit according to the invention;

DETAILED DESCRIPTION OF EXEMPLARY EMBODIMENTS

Figure 1:
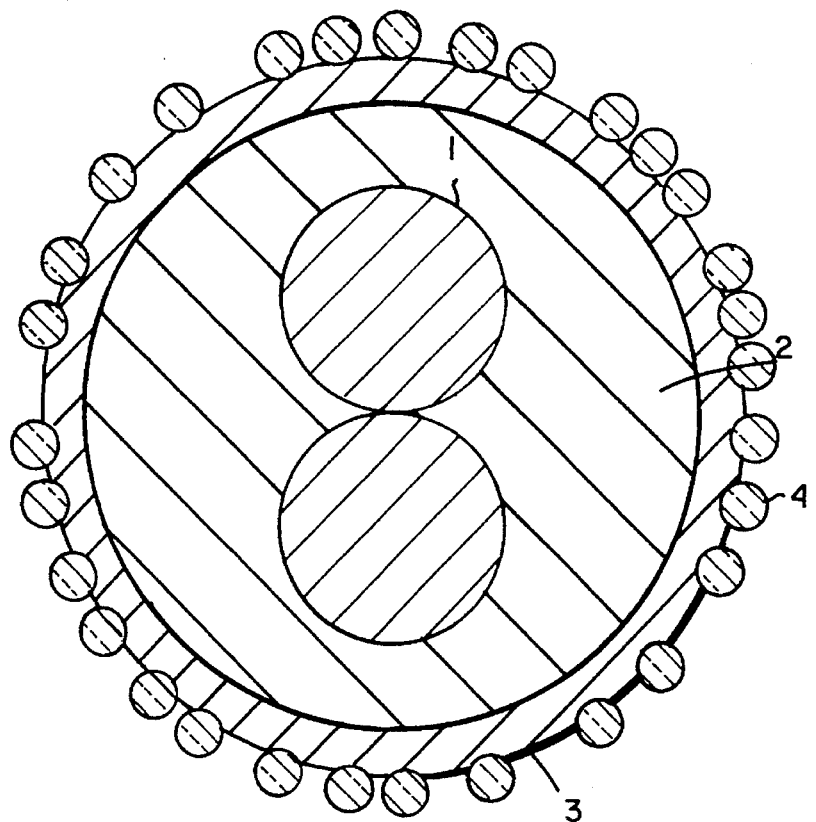
FIG. 1 is a schematic cross-sectional view through a two-fibre package according to the invention.

FIG. 1 shows a two-fibre package having an outer resin layer with modified surface. The two conventional fibres 1, which have both primary and secondary coatings, are nominally 260 µm in diameter. The fibres are positioned on either side of the centre line of the package, so that their secondary coatings just touch. The fibres are held in a soft buffer layer 2 which has an overall diameter of about 760 µm. In this example the buffer layer comprises a silicone-acrylate, Cablelite 950-701 (available from DSM Desotech, The Netherlands). About this buffer layer there is a further resin layer 3 which is a tough layer which serves to protect the buffer layers and fibres from mechanical and chemical attack. In this example layer 3 comprises Cablelite 950-705, a urethane-acrylate resin, and is about 50 µm thick. It is this layer whose surface is modified. In the present example, the modification consists of the inclusion and addition of glass microspheres 4 to the resin surface. The microspheres which are attached to the resin surface only after the application of the outer resin layer 3 to the cured buffer layer 2, are in this example hollow glass microspheres sold under the tradename "Q-CEL 500" by the PQ corporation (PO Box 840, Valley Forge, Pa. 19482, U.S.A.). The mean size (effectively the O.D.) of the microspheres is 68 µm (with a range of 10–180 µm). The microspheres are applied to the resin surface in such a way that they do not penetrate as far as the interface between the resin layer 3 and the buffer layer 2. The resin layer 3 is cured after the microspheres have adhered to it, leaving the microspheres trapped like flies on flypaper. The presence of the hard microspheres greatly reduces the friction which exists between the fibre package and the wall of the duct into which the package is blown. The reduction in friction contributes to the enhanced blowability of this package. A second factor which improves blowability is the enhanced viscous drag which the rough surface provides during blowing.

Figure 2:
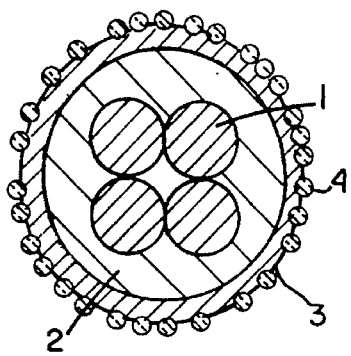
FIG. 2 is a schematic cross-sectional view through a four-fibre package according to the invention.

A similar 4-fibre package is shown in FIG. 2. Here the four fibres 1 are disposed symmetrically about and equidistant from the axis of the package. Again the secondary-coated fibres are arranged so that their secondary coatings just touch. Inter alia this helps to reduce the incidence of microbending due to thermal contraction/expansion.

Three examples of 4-fibre package units, numbered 347, 348 and 349, were made. In all these examples the buffer layer 2 comprised Cablelite 3287-9-39 and the outer layer 3 comprised Cablelite 950-705, both being urethane-acrylate resins available from DSM Desotech, the Netherlands. The '39 resin had a secant modulus at 2.5% strain of about 1.0 MPa, a tensile strength of 1.3 MPa, a Shore D hardness of 49 and a 115% elongation. The 705 resin has a tensile modulus at 2.5% strain of about 700 MPa, and a 43% elongation. The microspheres in these 4-fibre examples were hollow glass microspheres sold under the tradename "Q-CEL 520 FPS" by the PQ corporation. The mean size (effectively the O.D.) of these microspheres was 35 µm (with a range of 25–45 µm). Again the microspheres were applied to the resin surface in such a way that they did not penetrate as far as the interface between the resin layer 3 and the buffer layer 2. The resin layer 3, was cured after the microspheres had adhered to it.

The sizes for the three examplar 4-fibre Units were as follows:

| Unit | 347 | 348 | 349 |
|---|---|---|---|
| Diameter of layer 2 (μm) | 789 | 788 | 788 |
| Diameter of layer 3 (μm) | 930 | 924 | 913 |
| Thickness of layer 3 (μm) | 70.5 | 68 | 62.5 |
| Weight (gm$^{-1}$) | 0.69 | 0.70 | 0.71 |

Figure 3:
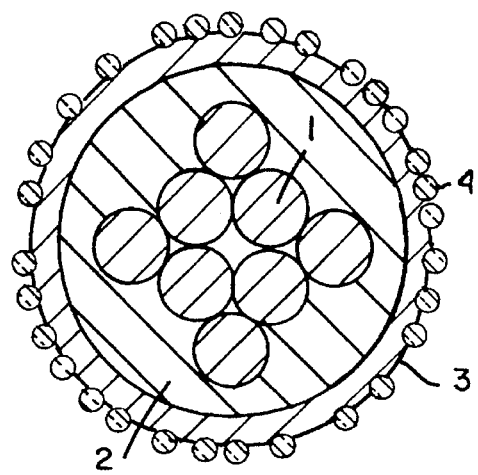
FIG. 3 is a schematic cross-sectional view through a eight-fibre package according to the invention.

FIG. 3 shows a similar 8-fibre unit. Four of the eight fibres are arranged as in the previous 4-fibre units. The other four fibres, the outer four, are again symmetrically disposed about the axis of the package, this time on the centre lines which separate adjacent ones of the inner four. As before, the fibres are disposed so that their secondary coating just touch. The overall diameter of the buffer layer in this case is about 1 mm and that of the outer layer is about 1.2 mm.

In FIG. 6 can be seen a micrograph of a section through an 8-fibre unit according to the invention. The micrograph, which shows some debris and resin loss resulting from the sectioning procedure, shows the extent of microsphere penetration into the outer resin layer. This is more clearly seen from the analysis (FIG. 6B) which accompanies FIG. 6A where the extent of penetration has been somewhat exaggerated as it includes the effect of debris.

We have carried out comparative tests to determine the bend radius at which fibre breakout will occur in a fibre unit sheathed according to the technique of EP-A-0345968 and a fibre unit wherein only the surface of the outer layer has been modified, that is according to the present invention.

The apparatus used is shown in FIG. 4A (and the exploded view at FIG. 4A). Two grooved plates (5 and 6) are mounted parallel to each other on guide rods (7). A motor (8) is mounted on one guide rod arranged so as to allow the motor to drive one grooved plate (6) towards the outer while maintaining the two plates in parallel. In use the fibre unit under test is placed in the groove in each plate and allowed to adopt a free loop shape between the plates. The distance D between the plates is then slowly reduced and the apex of the fibre unit loop is carefully observed for signs of fibre breakout.

The fibre unit radius at which this is first observed is the minimum bend radius.

The results of these comparative tests are shown in Table 1.

TABLE 1

| | minimum bend radii | |
|---|---|---|
| | Microspheres mixed in outer layer resin (as in EP 345968) | Microspheres applied to surface of outer layer resin (according to the present invention) |
| 4-fibre unit | 10 mm ± 2 | 2 mm ± 0.5 |
| 8-fibre unit | 50 mm ± 5 | 25 mm ± 2 |

The microspheres, outer layer resins and unit diameters used in these tests were identical for each of the two techniques for applying microspheres. As can be seen from table 1 the fibre units produced by the method of EP-A-0345 968 have significantly larger minimum bend radii than those produced by modifying only the surface of the outer layer resin. In practice we have found that when handling fibre units with microspheres mixed in to the outer layer resin fibre breakout was a significant problem. Indeed we found such fibre units unusable for all practical purposes. From a comparison of our new product and those made according to EP 345968 we have concluded that this poor breakout performance is probably due to the presence in the EP345968 products of microspheres at the interface between the outer and inner resin layers.

FIG. 5A is a photomicrograph showing an example of a fibre unit according to EP345968 which has suffered fibre-breakout; the accompanying analysis (FIG. 5A) shows more clearly the nature of the failure.

In a further comparative test two 4-fibre units, one coated according to the present invention and one coated according to the technique of EP-A-0345968 were wrapped loosely around a mandrel of 40 mm diameter and placed in an oven at 60° C. After 100 hours the unit coated according to '968 had suffered fibre breakout, whereas even after 1000 hours the unit coated according to the present invention had not suffered fibre breakout.

A further factor which we have found to be important in preventing fibre breakout is the choice of an outer layer resin with an appropriate percentage elongation figure. Manufacturers such as DSM Desotech measure the percentage elongation of a resin by stretching a cast film of the resin to its elastic limit.

A film of the resin of thickness 70 to 80 microns is first formed by curing with a dual D end mercury lamp which provides 3.5 Jcm$^{-2}$ of U.V. radiation at the film surface. Then the film is stretched in an environment of 22° to 24° C. and 50 to 55% relative humidity and the percentage elongation at failure is recorded.

We have found in practice that for a four fibre unit produced by applying microspheres to the surface of the outer layer an appropriate percentage elongation for the outer layer resin is approximately 35%. One such suitable resin is cablelite 950-705. We have found that a resin with a percentage elongation of approximately 15% (such as Cablelite 3287-9-31) is not sufficiently flexible to avoid fibre breakout when used for the outer layer of a 4-fibre unit.

For an 8-fibre unit we have found that due to its large diameter a higher percentage elongation is required of the outer layer resin than for a 4-fibre unit.

A method which we have found useful for estimating the percentage elongation required for different unit sizes is to scale the percentage elongation in accordance with the longitudinal extension experienced by the outside of a loop of a unit. For example a four fibre unit of 0.93 mm outer diameter formed into a loop of radius 10 mm would have a longitudinal extension at the outside of the loop of $$(0.93/2)/(10 + (0.93/2)) = 0.044$$
$$= 4.4\%$$

While an 8-fibre unit of 1.3 mm outer diameter bent into a loop of the same radius would have a longitudinal extension of $$(1.3/2)/(10 + (1.3/2)) = 0.061$$
$$= 6.1\%$$

Since we have found in practise that a material of approximately 35% percentage elongation is satisfactory for such a 4-fibre unit we can estimate that a percentage elongation of $$\frac{6.1}{4.4} \times 35 = 48.5\%$$

should be satisfactory for an 8-fibre unit.

Initial tests carried out with two high percentage elongation resins from DSM Desotech indicate that, in fact, a percentage elongation of approximately 40 (as measured by the technique described above) may be sufficient to avoid fibre breakout in an 8-fibre unit at a radius of 10 mm. The two high elongation resins were RCX-4-207 and RCX-4-208 having percentage elongations of 42 and 40 respectively.

In increasing the percentage elongation of a resin for use in the outer layer of a high fibre count unit a consequent increase in the frictional properties of the resin should be avoided as far as this is possible.

Figure 7:
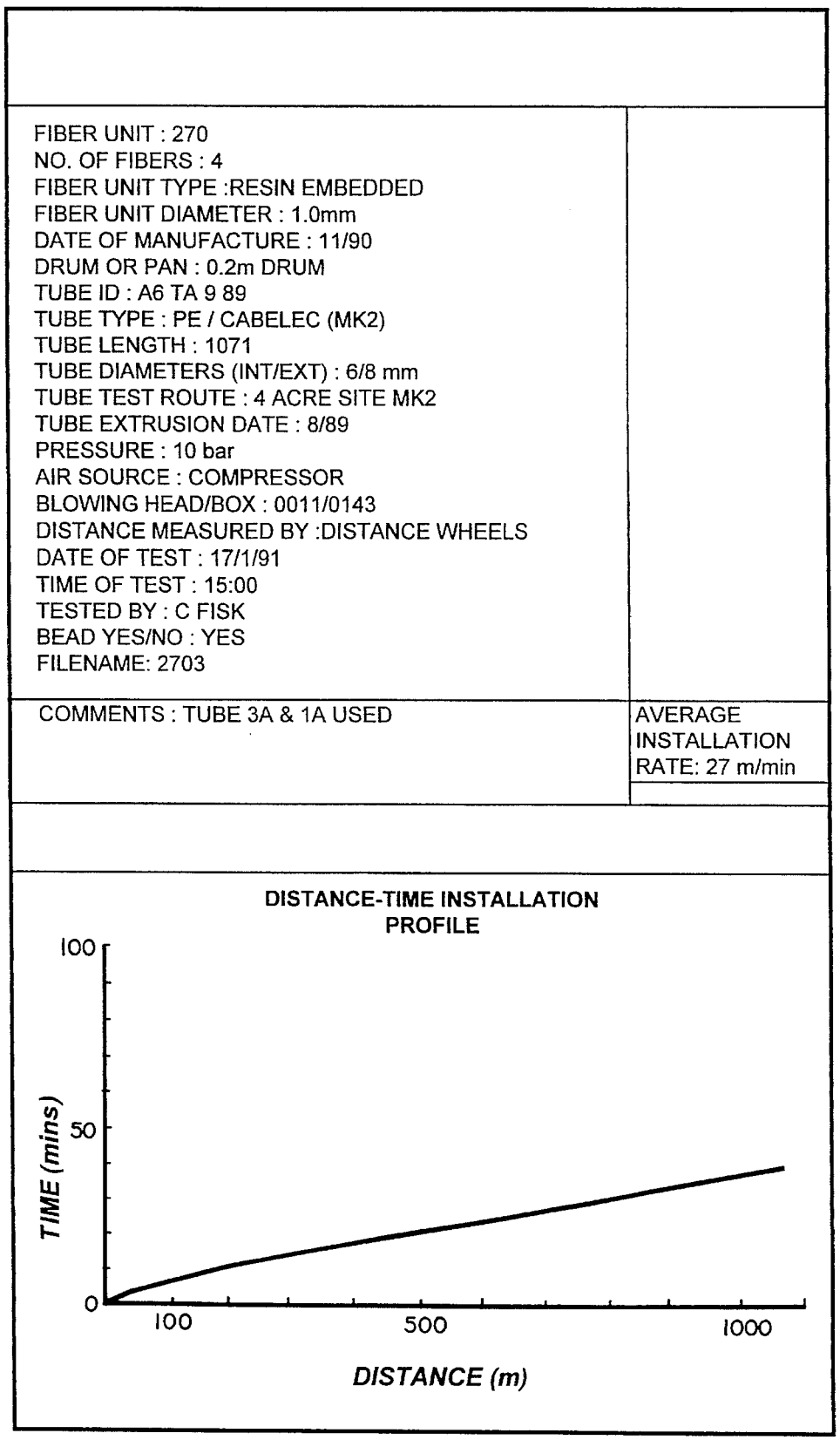

Some plots of blowability tests for fibre packages of the type shown in FIGS. 2 and 3 are shown in FIGS. 7 and 8. Note that FIG. 7 is for blowing into a trial duct network of 3.5 mm bore duct spread over a 4 acre site, the duct length being just over a kilometer. FIG. 8 is for a test carried out using a 300 meter duct wound in 4 layers around a 0.5 meter diameter drum.

Figure 9:
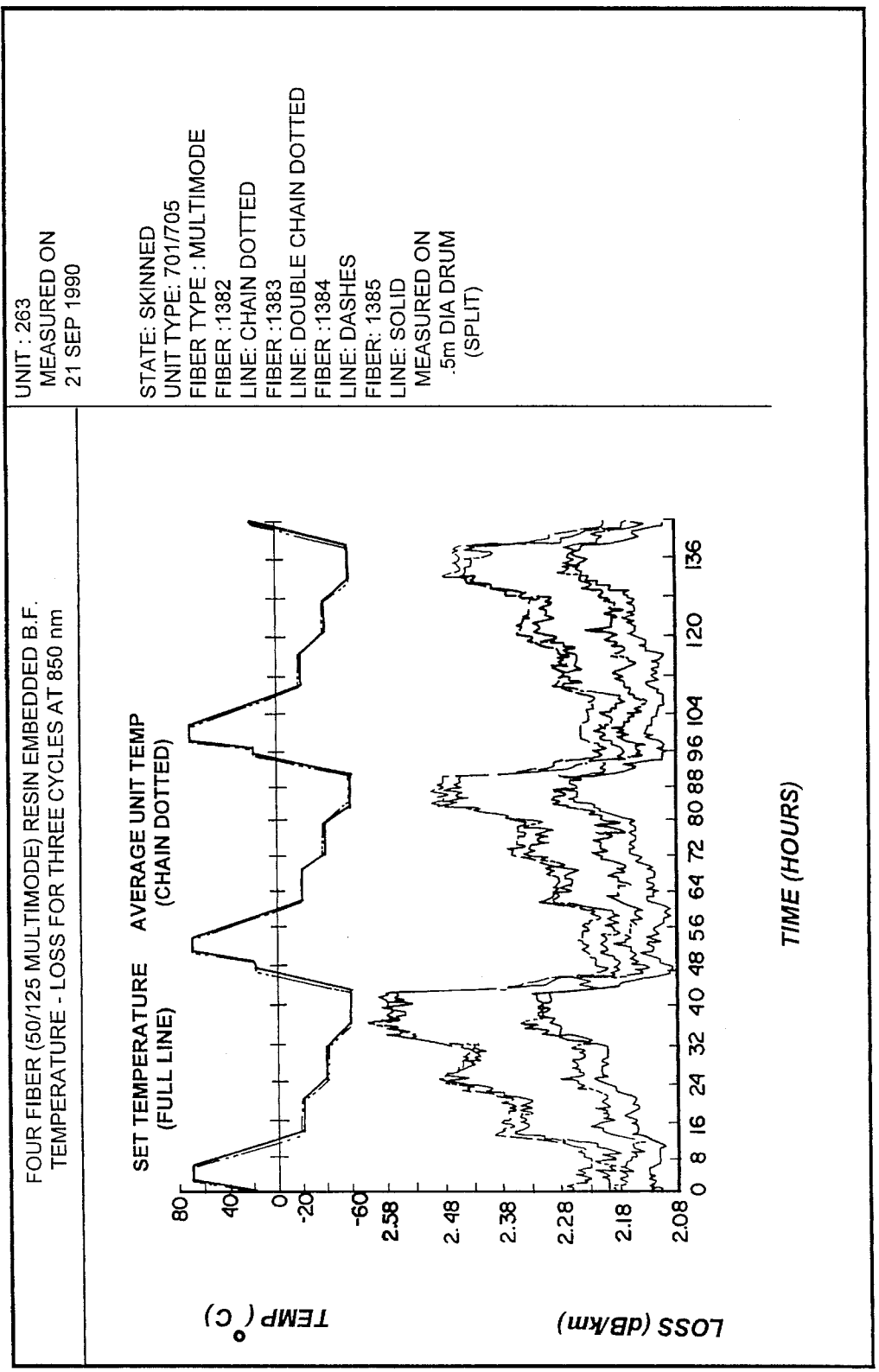
FIG. 9 is a plot showing the effects on fibre attenuation of temperature cycling on a four fibre package at different wavelengths.

FIG. 9 shows the effects on fibre attenuation of temperature cycling a sample 4-fibre unit.

To achieve good blowability of a fibre package unit low friction between the unit and the duct into which it is being installed is required. FIG. 10 shows a comparison between the coefficient of friction of two units modified with microspheres, a unit modified with mica flakes and an unmodified unit. The coefficient of friction is measured by attaching a weight (shown along the x-axis of FIG. 10) to one end of a unit which has been would around an 85 mm diameter glass tube and applying a known force to the other end of the unit. Referring to FIG. 11 the coefficient of friction is calculated from $\mu = (\ln T_1 - \ln T_2)/2\pi N$. The average of $\mu$ for five traversing speeds (controlled by $T_2$) for each weight $T_1$ is taken. From FIG. 10 it can be seen that the coefficient of friction for both the microsphere modified units is lower than for the other two units.

A further factor which affects blowability is any enhanced viscous drag provided by modification of the surface of a unit. This factor can be assessed by measuring the installation force generated on a unit while it is being installed into a short length of duct (a short length is used so that contributions from frictional forces are negligible).

FIG. 12 shows this installation force measured for various units. SF12 microspheres have a mean size of 65 μm, while CPO3 microspheres have a mean size of 10 μm.

As can be seen all the modified units have improved viscous drag over the unmodified unit.

The fibre packages shown in FIGS. 1 to 3 were all made on what is essentially a standard multifibre packaging line of the type used for the manufacture of ribbon cables. Suitable equipment can be obtained from Heathway Limited of Milton Keynes.

The equipment modifications which were needed for the manufacture of the packages shown in FIGS. 1 to 3 are limited to the coating dies plus the addition of surface modification equipment.

Briefly described with reference to FIG. 13, the processing sequence is as follows. The fibres are used straight from the drums on which they are dispatched by manufacturers. The drums are mounted on one or more pay-off stands from which they are fed under tension, via individual or common guide wheels, to the first pressurised coating system 17. The fibres 27 pass down the tower, through the first pressurised coating system 17, through a resin-curing system 18 (typically including a UV lamp system), possibly through a size monitor, through a second pressurised coating system 14, through a surface modification zone 26 (e.g., with fluidized microspheres 25 being electrostatically applied pursuant to control unit 24), through a resin-curing system 23 (again typically including a UV lamp system), possibly through another measuring or inspection unit, and then on, via a capstan, to a drum or pan winding system 22. Typically the winding system will be not part of the processing tower.

FIG. 14 shows the parameters used in the above process to produce unit 348 and these parameters are typically of those used to produce all 4 fibre units, The coating die which is used in each case to produce the inner coated structure, that is the layer 2 in FIGS. 1 to 3, is of special significance for all multiple fibre counts. This coating die is located in the first pressurised coating system. This inner coating die is specially profiled to hold the fibres in registration prior to the application of the resin 2. This enables an accurately centred structure to be produced, facilitating the achievement of uniform coating thicknesses and hence improved performance and stability. The outer coating die, which is used for the application of the outer resin layer, is a standard fibre coating profile.

The die arrangement for the pressurized coating system is as follows. A die body has a fibre input, a fibre output and a pressurized resin feed. There is a first die on the fibre input and a second, larger die on the fibre output. The size and shape of the output die determine the size and shape of coating achieved. In the present embodiments we are only interested in achieving resin coatings of circular cross-section, so the output die is shaped accordingly. On the second pressurised coating system the incoming fibre assembly already has the first resin coat, the buffer layer 2 of FIGS. 1 to 3. Thus a circular orifice, appropriately larger than the buffer layer diameter, is suitable for the inlet-end die on the second coating system.

It is the inlet-end die of the first pressurised coating system which is used to ensure the registration of the fibres at the time of coating with the first resin layer. In the case of the 2-fibre unit, the die throat is elliptical with the major axis of the ellipse approximately twice the minor axis, and the minor axis being about 10% larger than the diameter of the optical fibres which are to be packaged. The die inlet is of circular section and, as is conventional, flared. To avoid wear and damage to the fibre and dies, in each die head the two dies should be concentric and accurately aligned with the fibre path and each other.

For the 4-fibre package the die throat of the relevant die is similar to that for the 2-fibre package except that the "ellipse" has major and minor cases of virtually the same length. In practice, the long axis is as in the 2-fibre package case and the "short" axis is double the length of the short axis used in the 2-fibre package case.

For the 8-fibre package the die throat is a more complicated shape, reflecting the desired disposition of fibres in the package. Again, a 10% clearance is provided relative to the nominal outline of the fibres in the package.

In view of the relatively tight tolerance that is required of the die dimensions if the fibre package is to be suitably uniform, it is of course important to ensure that the incoming fibres are supplied to a suitably tight specification.

In this embodiments shown in FIGS. 1 to 3, the surface modification was achieved by adhering glass microspheres to the surface of the resin 3. The microspheres come as a free-flowing powder. Because of their small size and low density, it is readily possible to fluidise or aerate a mass of them. By causing there to be such aerated mass about the wet resin surface 3 between the second pressurised coating system and the second resin curing location, it is possible to get microspheres to adhere to the wet resin. To assist this process and to give a uniform distribution of microspheres on the surface of the package, it is preferable to electrostatically charge the microspheres after they have been fluidised. This is done by passing the fluidised microspheres through a conventional electrostatic spray gun operating at 10–100 kV before they are directed at the fibre package. The charged microspheres are attracted to the fibre package while being mutually repulsive, thus facilitating a controlled, uniform coverage of the fibre package surface.

Figure 13:
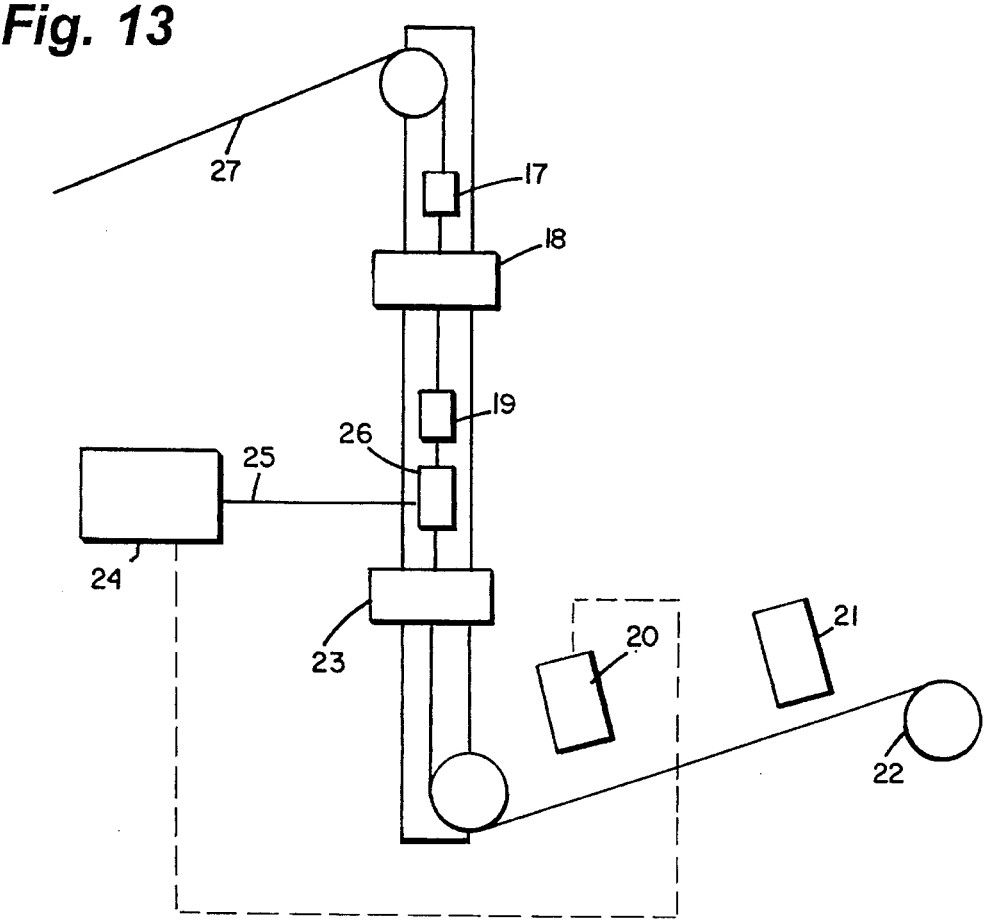
FIG. 13 is a schematic illustrating the major elements in a production line for producing fibre unit.
Figure 15:
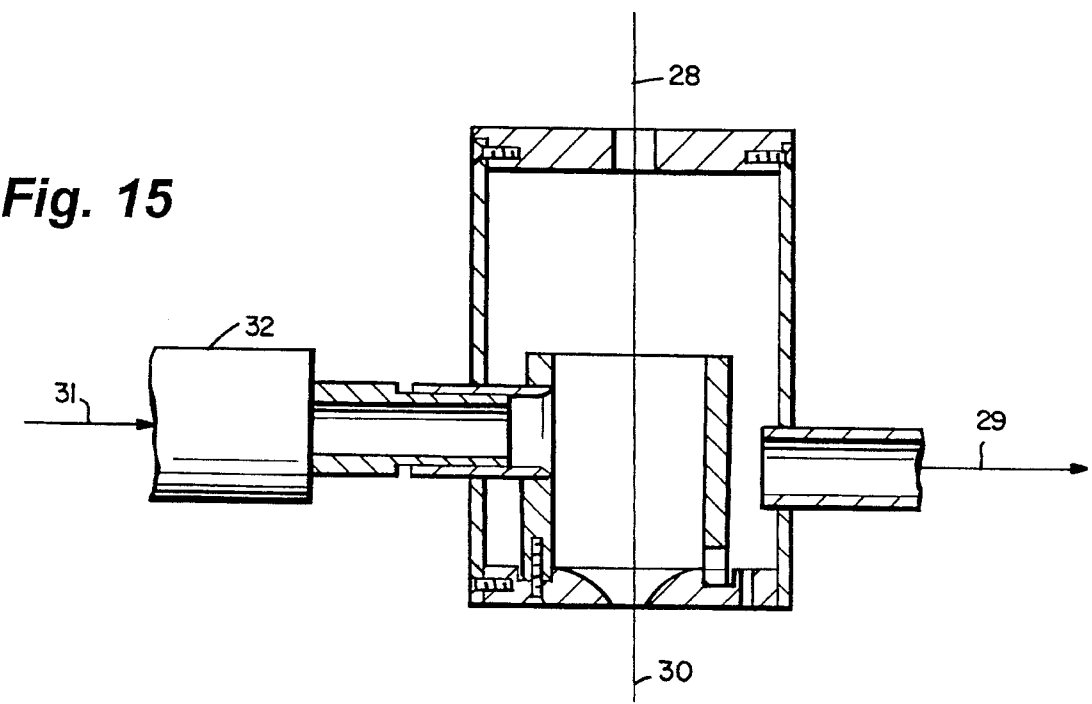
FIG. 15 is a sectional diagram showing details of a coating chamber for surface modification according to the invention.

FIG. 15 shows an enlarged view in cross-section of the coating chamber 26 of FIG. 13, in which the electrostatic gun 32 with its input of fluidized particles 31 (and vacuum extraction of excess particles at 29) can be seen. The coated fibre 28 (with uncured top coat) has its surface modified upon passage therethrough to become a modified surface fibre 20 before passage to curing station 23.

In addition to the above-mentioned Q-CEL 500 and Q-CEL 520 FPS microspheres, there are other suitable microspheres. Q-CEL 400 (available from AKZO Chemicals), which has a mean particle size of 75 μm (80% in the range 10–120 μm) and a lower density than Q-CEL 500, Q-CEL SF, which has a 100% size range of 10–125 μm, with a mean of 65 μm, "Extendospheres XOL 70", with a nominal size of 70 μm, and "Extendospheres SF12" with a mean size of 65 μm are particularly suitable.

Figure 16:
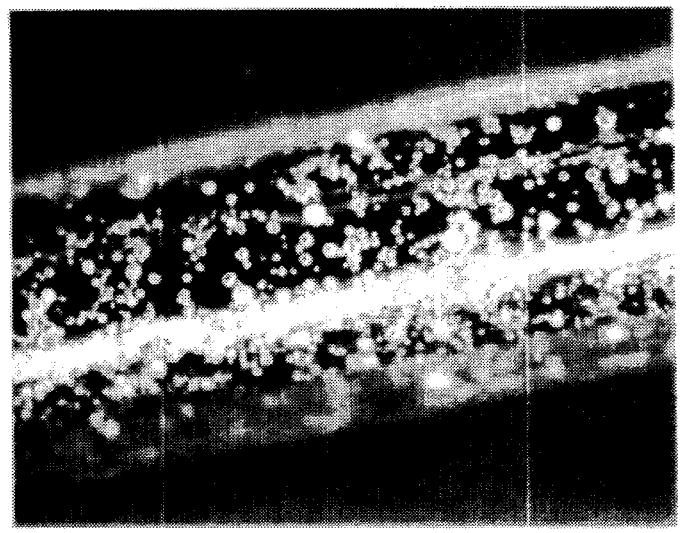
FIGS. 16 to 18 are optical micrographs of four-fibre packages according to the invention.
Figure 17:
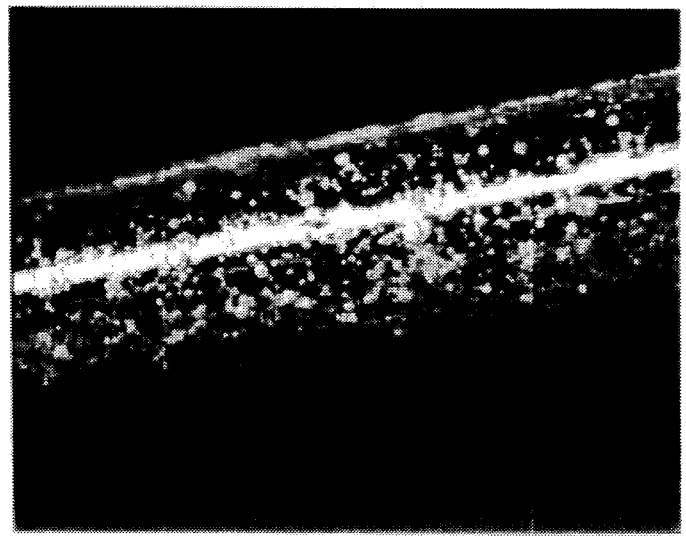
Figure 18:
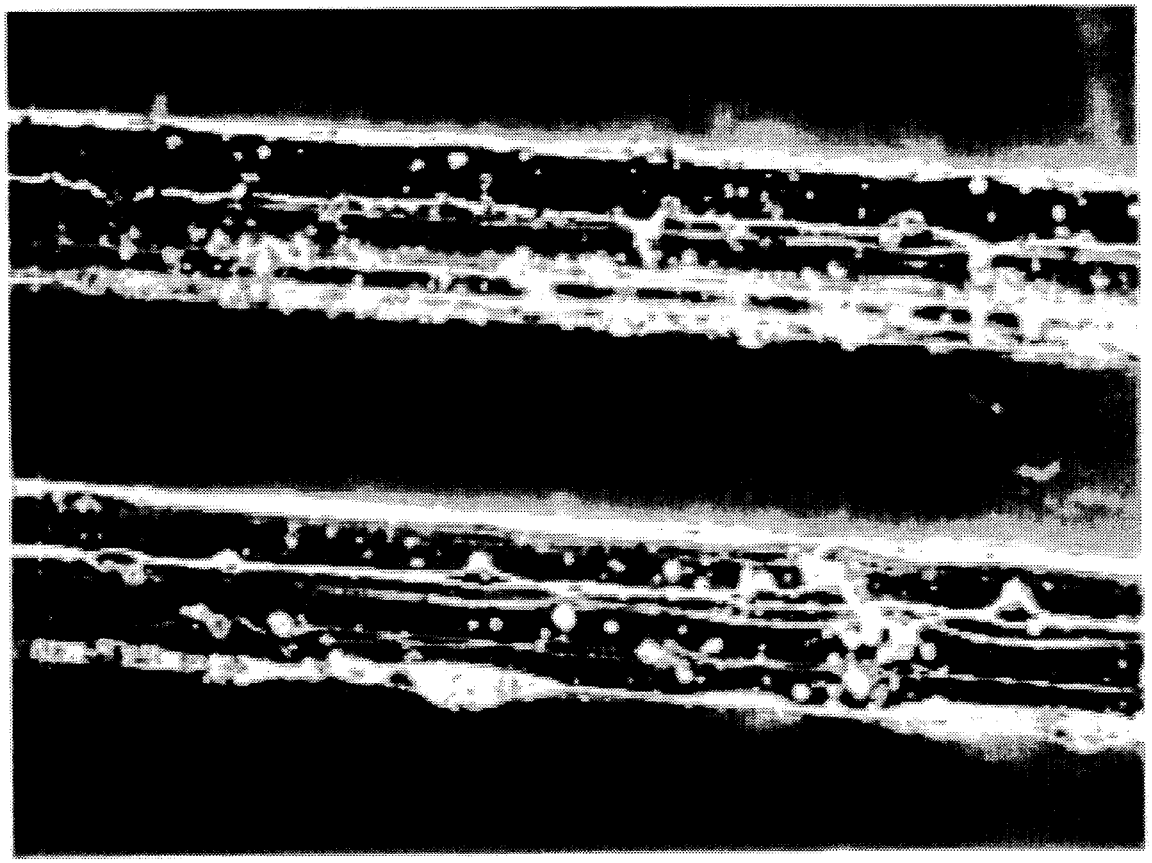

FIGS. 16 and 17 are optical micrographs of four-fibre units. Both units have a buffer layer of Cablelite 950 -701 and an outer layer of Cablelite 950-705. The microspheres (Extendospheres SF12) were applied electrostatically using a gun voltage of 90 KV and can be seen to be uniformly distributed on the outside surface of the outer layer. The units shown in FIG. 18 have Q-CEL 500 microspheres.

As an alternative to the use of microspheres we have achieved good results with thin platelets of natural mica, with sizes in the range 40–200 μm, which are sold as pigments under the tradename "Iriodin" by Merck. Again, we have found that the use of electrostatic coating is advantageous.

More irregularly shaped non-plate-like particles, i.e. lumps, may be course be used in place of the microspheres or platelets. The lumps may be of glass or of a polymer which will give rise to low friction of the fibre unit against the relevant duct material, for example PTFE particles such as those described in EP-A-0345968 could be used.

It should be noted of course that the microspheres are not, and need not be, perfectly spherical.

A further alternative is to modify the resin surface without the addition of particulate matter. By passing the uncured second resin 3 through a ring of air jets directed at the coating surface we have achieved a significant and useful texturing. Again of course the resin is cured after being textured.

The following tests have been used to demonstrate the mechanical performance of the fibre packages according to the invention. No permanent damage is defined as:

(a) the reversibility of attenuation with ±0.05 dB measured at a wavelength of 1300 nm at 20° C.

(b) a maximum change in diameter ratio of 0.05, after any mechanical test. Where diameter ratio is the ratio of the maximum diameter to the minimum diameter of the fibre unit.

Strength

The fibre unit shall have sufficient strength to withstand a tensile load equivalent to the weight per unit length of the fibre package multiplied by the maximum blowing length. The load shall not produce a total strain exceeding 0.25% in the fibres, and shall not cause permanent damage to the component parts of the unit. The load shall be sustained for 10 minutes and the strain of the fibres monitored. The target value for the residual strain in the fibres after the load is removed is zero. A maximum of 0.05% would be acceptable for production units.

Flexibility

The fibre and the component parts of the package shall not suffer permanent damage and shall regain circularity when the package is repeatedly wrapped and unwrapped by hand 4 complete turns for 10 complete cycles, around a mandrel 40 mm in diameter.

Compressive Stress

The fibres and the component parts of the package shall not suffer permanent damage during the application of a compressive load of 50 Newtons applied between two flat plates of dimensions 50 mm by 50 mm. The plate edges shall have a radius of 3 mm. The load shall be applied for a period of 60 seconds.

Also a destructive compressive test is applied in which a compressive load of 500 Newtons is applied for a period of 15 minutes. As a result of this test the fibre must not be broken, but the fibre unit need not meet the diameter change test described above.

Blowability

Type 1 Tube

The fibre unit shall be blown into a 300±30 m length of BT-approved 3.5 mm ID tubing wound onto reels of 500 mm barrel diameter and 250 to 300 mm between flanges.

The installation period for this length shall not exceed 30 minutes using standard BT approved blowing apparatus.

Type 2 Tube

The fibre unit shall be blown into a 1000±30 m length of BT approved 3.5 mm ID tubing installed into a BT-approved route.

The installation period for this length shall not exceed 100 minutes using standard BT approved blowing apparatus.

These blowing tests apply over the temperature range 0° to +60° C.

Fibre units 347, 348 and 349, blew into a 300 meter length of 3.5 mm bore duct, wound about a drum 0.5 meter diameter, in between 12 minutes and 12 minutes 40 seconds, with an applied pressure of 7 bar. The blowing head was a wheeled head as described in EP-B-108590 and the duct was as described in EP-A-432171. The average installation rate was therefore about 24 meters per minute.

It is believed that the blowability of units according to the present invention is improved, at least when hard microballs are used, because the microballs are not coated in the resin of the fibre unit, unlike those made according to the technique of EP-A-345968.

Of course units made according to the present invention may comprise single-mode fibres or multimode fibres or both together.

We claim:

1. An optical fibre package for blow installation comprising:

at least one optical fibre, and an outer layer of cured flexible resin, the surface of said resin layer having been modified after the formation of the layer but prior to the cure of said resin, the resin layer including an inner zone, remote from the surface, which is unaffected by the surface modification process, effects of the surface modification still being detectable.

2. A package as in claim 1 containing at least two optical fibres, wherein the package, at 20° C., has a minimum bend radius at which fibre breakout occurs of less than 10 mm.

3. A package as in claim 2, wherein the package comprises four optical fibres.

4. A package as in claim 3, having only four optical fibres wherein the outer layer of resin has a percentage elongation greater than 15 at 20° C.

5. A package as in claim 1, wherein said outer layer of resin has a percentage elongation greater than 30 at 20 degrees celsius.

6. A package as in claim 1 wherein the package comprises eight optical fibres and said outer layer of resin has a percentage elongation greater than 35% at 20° C.

7. Use of an optical fibre package as in claims 1, 2, 3, 5, 6 or 4 in a blown fibre installation process wherein the optical fibre package is installed along a previously installed duct using fluid drag of a gaseous medium which passes through the duct in the desired direction of advance.

8. An optical fibre package for blow installation comprising:

at least one optical fibre, and an outer layer of cured flexible resin which has been non-homogeneously modified after formation of the layer, but prior to cure of the resin, to leave a detectable surface modification without substantially modifying an inner zone of the layer extending outwardly from said at least one optical fibre.

9. An optical fibre package for blow installation comprising:

at least one optical fibre, and an outer layer of cured flexible resin extending radially outwardly from said at least one fibre, said resin having been subjected just prior to curing to modifications which increase as the radius increases to leave a detectable surface modification after the resin is cured without substantially modifying a radially innermost zone of the layer.

* * * * *